United States Patent [19]

Zucchini et al.

[11] Patent Number: 5,219,961
[45] Date of Patent: Jun. 15, 1993

[54] CATALYSTS FOR PREPARING SATURATED ELASTOMERIC OLEFINIC COPOLYMERS AND TERPOLYMERS

[75] Inventors: Umberto Zucchini; Viviano Banzi; Illaro Cuffiani, all of Ferrara, Italy

[73] Assignee: Ausimont S.p.A., Milan, Italy

[21] Appl. No.: 808,080

[22] Filed: Dec. 11, 1991

Related U.S. Application Data

[60] Continuation of Ser. No. 580,347, Sep. 7, 1990, abandoned, which is a continuation of Ser. No. 397,649, Aug. 22, 1989, abandoned, which is a division of Ser. No. 221,672, Jul. 20, 1988, abandoned.

[30] Foreign Application Priority Data

Jul. 30, 1987 [IT] Italy ............................ 21510 A/87

[51] Int. Cl.$^5$ .............................................. C08F 4/44
[52] U.S. Cl. ................................. 526/125; 526/124; 526/148; 526/151; 526/348.6; 502/115; 502/125; 502/133; 502/134
[58] Field of Search ................. 526/124, 125, 151, 148

[56] References Cited

U.S. PATENT DOCUMENTS

| | | | |
|---|---|---|---|
| 3,135,809 | 6/1964 | Bosmajian | 502/114 X |
| 3,789,036 | 1/1974 | Longi et al. | 260/89.7 |
| 4,013,823 | 3/1977 | Longi et al. | 526/125 X |
| 4,089,808 | 5/1978 | Zucchini et al. | 252/429 C |
| 4,209,602 | 6/1980 | Kuroda et al. | 502/105 X |
| 4,220,554 | 9/1980 | Scatá et al. | 502/134 X |
| 4,315,835 | 2/1982 | Scatá et al. | 502/125 X |
| 4,399,054 | 8/1983 | Ferraris et al. | 526/125 X |
| 4,525,554 | 6/1985 | Tanaka et al. | 502/134 X |
| 4,673,719 | 6/1987 | Kioka et al. | 502/125 X |
| 4,727,051 | 2/1988 | Breen et al. | 502/134 X |

FOREIGN PATENT DOCUMENTS

| | | |
|---|---|---|
| 0096770 | 5/1983 | European Pat. Off. . |
| 0202550 | 5/1986 | European Pat. Off. . |
| 2434180 | 3/1980 | France . |
| 879026 | 11/1970 | Italy . |
| 890604 | 9/1971 | Italy . |
| 685328 | 9/1979 | U.S.S.R. .................. 502/134 |
| 1277353 | 6/1972 | United Kingdom . |
| 1277629 | 6/1972 | United Kingdom . |
| 1293814 | 10/1972 | United Kingdom . |
| 1519472 | 7/1978 | United Kingdom . |

Primary Examiner—Patrick P. Garvin
Attorney, Agent, or Firm—Bryan Cave

[57] ABSTRACT

Catalytic components for copolymerizing ethylene with alpha-olefins, or alpha-olefins with one another, and possibly with a diene as a termonomer, suitable for producing saturated and unsaturated elastomeric copolymers are disclosed. The catalytic components are compounds obtained by the reaction of:

(1) a magnesium compound having the formula:

$$R'_y MgX_n(OR)_{2-n}$$

(wherein R, R' = alkyl, cycloalkyl, aryl; X = Cl, Br; n is from 0 to 1.8, y is from 0 to 1, and n+y=2), or (2) a Mg-alcohol adduct;

with a titanium compound having the formula:

$$Ti(OR)_z X_{4-z}$$

wherein X and R are as defined above and Z is from 0 to 1, the compounds being charcterized by a Mg/Ti ratio of from 0.5 to 50 and an OR/Ti ratio of from 0.7 to 10. The copolymers produced using these catalytic components are endowed with improved tension-set characteristics in the vulcanized state.

4 Claims, No Drawings

CATALYSTS FOR PREPARING SATURATED ELASTOMERIC OLEFINIC COPOLYMERS AND TERPOLYMERS

This is a continuation of U.S. application Ser. No. 07/580,347, filed Sep. 7, 1990, now abandoned, which is a continuation of U.S. application Ser. No. 07/397,649, filed Aug. 22, 1989, now abandoned, which is a divisional of U.S. application Ser. No. 07/221,672, filed Jul. 20, 1988, now abandoned.

BACKGROUND OF THE INVENTION

1. Technical Field

The present invention relates to novel catalyst components for preparing essentially amorphous copolymers of ethylene and/or alpha-olefins and, possibly, either conjugated or non-conjugated dienes. More particularly, the invention relates to the catalysts comprising such components, to the preparation of the above-mentioned copolymers using said catalysts, and to the copolymers and the vulcanized products obtained thereby.

2. Description of the Prior Art

The copolymerization of ethylene and alpha-olefins, either in the presence or in the absence of dienes, has been generally carried out with Ziegler-Natta catalysts and, in particular, with catalysts obtained by the reaction of an organometallic aluminum compound and a vanadium compound (see GB Patent Nos. 1,277,629; 1,277,353; and 1,519,472; and Italian Patent Nos. 890,604 and 879,026).

However, the activity of these catalysts and, consequently, the polymer yield relative to the amount of catalyst used, are relatively poor, especially if the diene is 1,3-butadiene. Thus, polymers obtained by these prior art methods require purification to remove catalyst residues by means of expensive supplementary processes.

Catalysts endowed with considerably higher activity for copolymerizing ethylene with alpha-olefins, which are therefore able to overcome the drawbacks described above, have been disclosed in prior patents, e.g., in U.S. Pat. Nos. 3,789,036 and 4,089,808; and Belgian Patent No. 893,443.

SUMMARY OF THE INVENTION

Novel catalyst components have now been found that, in addition to showing high catalytic activities (and therefore the above-mentioned technical-economical advantages), also make it possible to produce olefinic elastomers, the vulcanized products of which are endowed with very good elastic properties, particularly tension-set values. The superior elastic properties are achieved when the elastomers are comprised of terpolymers of ethylene and propylene with a diene, such as 1,3-butadiene.

The catalytic components of the present invention comprise a product of the reaction of:

(a) a magnesium compound having the general formula:

$$R'_y MgX_n (OR)_p$$

wherein:
X = Cl or Br;
R and R' may be the same or different from each other, and are each selected from the group consisting of aliphatic, cycloaliphatic and aromatic hydrocarbon radicals containing from 1 to 20 carbon atoms;
n is a number from 0 to 1.8, inclusive, and preferably from 0.5 to 1, inclusive;
p is a number from 0.2 to 2.0;
y is a number from 0 to 1, inclusive; and
n+y+p=2;
or a magnesium compound, namely an alcohol adduct of Mg chloride, having the formula:

$$MgCl_2 \cdot mROH$$

wherein
R is as defined above, and
m is a number from 0.2 to 6, and preferably from 0.5 to 3, inclusive; and (b) a titanium compound having the formula:

$$Ti(OR)_z X_{4-z}$$

wherein X and R are as defined above and Z is a number from 0 to 1, inclusive.

The reaction product is characterized by a Mg/Ti molar ratio from 0.5 to 50, preferably from 1 to 10, inclusive, and an OR/Ti molar ratio from 0.7 to 10, preferably from 1.5 to 5, inclusive. In determining the number of OR moles in the reaction product, the OR groups contained in the ROH molecules of $MgCl_2 \cdot mROH$ compound are included. Values for the OR/Ti molar ratio are preferably higher than 1.5.

DETAILED DESCRIPTION OF THE INVENTION

Various methods may be used to obtain the catalytic components of the invention. A preferred method involves reacting a magnesium compound as above defined (compound a), with either titanium chloride or titanium bromide, optionally in the presence of aliphatic, aromatic or chlorinated hydrocarbon solvents at temperatures of from 20° to 150° C. A suitable temperature is selected as a function of the concentration and amount of titanium halide used, with a higher concentration of titanium halide (up to 100%) leading to the selection of a lower reaction temperature within the above-defined temperature range.

Examples of magnesium compounds which can be used in preparing the catalytic component are: $Mg(OC_2H_5)_2$, $Mg[O(i-CH_3H_7)]_2$, $MgOC_2H_5Cl$, $MgCl_2-C_2H_5OH$, $MgCl(OC_6H_5)$, and their mixtures. In particular, $MgCl(OC_2H_5)$ has been found to be very advantageous.

Examples of titanium compounds which can be used are $TiCl_4$, $TiBr_4$, $TiCl_3OC_2H_5$, and $TiCl_3OC_4H_9$.

Preferred reaction conditions include the use of a titanium halide at a concentration of from 100 g/liter of solvent, up to pure titanium halide, temperatures of from 50° to 140° C., and titanium/magnesium molar ratios of from 1 to 20, and more preferably from 5 to 10. By suitably selecting the temperature, Ti halide concentration and Ti/Mg ratio, e.g., by simple experimentation, anyone skilled in the art can easily prepare the catalytic component of the present invention.

When the titanium compound has less than 4 chlorine or bromine atoms, a halogenating agent, e.g., a chlorinating agent, is preferably also used. The halogenating agent may be selected from the following classes:

halides of organic and inorganic acids, such as, e.g., AlCl$_3$, SOCl$_2$, SO$_2$Cl$_2$, BCl$_3$, PCl$_3$, POCl$_3$, RSO$_2$Cl, or RCOCl;

halogentated silicon compounds, such as, e.g., SiCl$_4$, SiHCl$_3$, SiRCl$_3$, SiR$_2$Cl$_2$, Si(OR)Cl$_3$, or Si(OR)RCl$_2$;

wherein R is as defined for compound (a) above.

The amount of halogenating agent used may vary over a broad range relative to the magnesium compound present, provided the molar ratios of Mg/Ti and OR/Ti of the catalytic component are maintained with the above defined ranges.

In cases where a halogenating agent is employed, the reaction temperature is generally from 0° to 200° C., and preferably from 20° to 150° C. The most suitable temperature in each case depends on the types of reactants employed.

The catalysts of the present invention are obtained by reacting a catalytic component described above with a metal-alkyl compound. The metal is selected from Groups I, II or III of the Periodic Chart, and a particularly suitable metal is aluminum. Examples of Al-alkyls which may be used are Al(C$_2$H$_5$)$_3$, Al(i—C$_4$H$_9$)$_3$, Al(n—C$_8$H$_{17}$)$_3$, and Al(i—C$_4$H$_9$)$_2$H.

The molar ratio of the aluminum-alkyl to the transition metal in the catalytic component is higher than 1:1, and is generally from 1:1 to 100:1.

The copolymerization of ethylene and/or alpha-olefins, optionally with the above-defined dienes, is carried out according to known methods, in the presence of an inert hydrocarbon solvent (in which the copolymer often remains in solution) or in the absence of solvents.

In cases where the copolymerization is accomplished in an inert hydrocarbon solvent, it is preferably carried out in the presence of an excess of propylene (or of a propylene/propane mixture), wherein the polymer produced is not soluble in propylene. In such cases, after the removal of the monomers, the polymer may be used without any purification treatments to remove catalytic residues, due to the high activity of the catalysts of the present invention.

The polymerization temperatures may vary over a wide range, e.g., from 0° to 80° C. and preferably from 25° to 40° C.

The alpha-olefins used in the copolymerization reaction are of the general formula:

$$R-CH=CH_2$$

wherein R is an alkyl of from 1 to 5 carbon atoms, preferably propylene, butene-1, 4-methyl-pentene-1, hexene-1, or octene-1. Propylene is preferred, particularly when used in combination with ethylene. Examples of dienes which may be used are 1,3-butadiene, isoprene, 5-ethyldiene-2-norbornene, 1,4-hexadiene and dicyclopentadiene. 1,3-Butadiene and 5-ethyldiene-2-norbornene are preferred.

The saturated and unsaturated olefinic polymers obtained according to the present invention may be crosslinked or vulcanized according to known formulations which are based on peroxides, peroxide/sulphur mixtures and sulphur with accelerants. The vulcanized products exhibit very good elastic properties, e.g., tensile strength, tension set, etc., as compared to corresponding vulcanized copolymers obtained with traditional catalysts that are based on vanadium compounds.

A further novel and unexpected aspect of the present invention is that the new catalysts, contrary to previously known catalysts, also show high catalytic activity in the terpolymerization of an ethylene/alpha-olefin/conjugated diene system, particularly in the terpolymerization of ethylene/propylene/1,3-butadiene. Additionally, the terpolymers obtained thereby produce vulcanized products endowed with particularly good elastic properties.

This result is of considerable interest because the use of butadiene in place of other, non-conjugated dienes which are presently used in the preparation of unsaturated olefinic elastomers, provides significant technical and economic advantages. For example, the finishing processes are simpler and cheaper, the quality of the end product is better, and butadiene is a lower cost material as compared to other dienes.

The following non-limitative examples are given for illustrative purposes.

EXAMPLE 1

Inside a Keller flask of 500 cm$^3$, equipped with a jacket, G-3 fritted glass diaphragm, bottom drain, and a mechanical stirrer, 160 ml of TiCl$_4$ and 16 g of chloroethoxy-magnesium [Mg—Cl(OC$_2$H$_5$)] containing 21% Mg and 45% (OC$_2$H$_5$) groups by weight are mixed at 10° C.

Within 1 hour, the temperature is increased to 80° C. by circulating oil inside the jacket, and the temperature is kept at this value for 6 hours. After filtration at 80° C., 160 ml of pure TiCl$_4$ (100% concentration) is added, the temperature is increased again to 80° C., and is maintained at this value for 2 hours. After filtration at 80° C., the catalyst is twice washed with anhydrous hexane at 50° C. and three times at room temperature.

The catalytic solid is finally dried under vacuum at 40° C. for 1 hour.

The solid was analyzed and found to have Mg/Ti and C$_2$H$_5$O/Ti molar ratios of 4.5:1 and 1.75:1, respectively.

The catalyst was used to polymerize ethylene with propylene and 1,3-butadiene; the synthesis conditions and the results obtained are reported in Table 1.

EXAMPLE 2

The same equipment as was used for the preparation of the catalytic component of Example 1 was employed. 50 ml of TiCl$_4$, diluted with 50 ml of anhydrous n-heptane, and 10 g of the same magnesium compound as described in Example 1, were mixed at 10° C.

Within 1 hour, the temperature was increased to 80° C., and kept at this value for 4 hours. After filtration at 80° C., 50 ml of n-heptane and 50 ml of TiCl$_4$ were added.

The subsequent steps were carried out as reported in the preparation of the catalytic component of Example 1.

The catalytic solid obtained showed the following molar ratios: Mg/Ti=4.0:1; C$_2$H$_5$O/Ti=1.83:1.

The catalyst was tested in the polymerization of ethylene with propylene and 1,3-butadiene; the synthesis conditions and the results obtained are reported in Table 1.

EXAMPLE 3

Using the same equipment as disclosed in Example 1, 150 ml of TiCl$_4$ and 51 g of the same magnesium compound as described in Example 1 were mixed.

Within 30 minutes, the temperature was increased to 40° C., and kept at this value for 2 hours. After filtration at 40° C., the catalytic solid was washed with anhydrous n-hexane, once at 40° C. and twice at room temperature. The product was then dried under vacuum at 40° C. for 1 hour.

The solid was analyzed and found to have the following molar ratios: Mg/Ti=3.6:1; $C_2H_5O$/Ti=3.23:1.

The catalyst was tested in the polymerization of ethylene with propylene and 1,3-butadiene; the synthesis conditions and the results obtained are reported in Table 1.

EXAMPLE 4

The synthesis of the catalytic component of Example 3 was repeated, the only difference being that the synthesis was carried out at 25° C.

The catalytic solid was vacuum dried at 40° C. for 1 hour and the analysis showed the following molar ratios: Mg/Ti=3.9:1; $C_2H_5O$/Ti=4.61:1.

The catalyst was tested in the polymerization of ethylene with propylene and 1,3-butadiene; the synthesis conditions and the results obtained are reported in Table 1.

EXAMPLE 5

20 g of magnesium chloro-ethoxide, prepared as in Example 1, was refluxed with 200 ml of $SiCl_4$ for 6 hours. A solid was obtained which contained, by weight: —$OC_2H_5$ groups=26.4%; Mg=24.5%.

Using the same equipment as used for preparing the catalytic component of Example 1, 31 ml of $TiCl_4$, diluted with 70 ml of anhydrous n-heptane, and 10 g of the above described magnesium compound were mixed at 10° C.

Within 1 hour, the temperature was increased to 80° C., and kept at this value for 4 hours. After filtration at 80° C., 31 ml of $TiCl_4$ and 70 ml of anhydrous n-heptane were added. The temperature was increased again to 80° C., and maintained at this value for 2 hours.

The subsequent steps were the same as reported in the preparation of the catalytic component of Example 1.

Analysis showed the solid to have the following molar ratios: Mg/Ti=5.5:1; $OC_2H_5$/Ti=2.19:1.

The catalyst was tested in the polymerization of ethylene with propylene and 1,3-butadiene; the synthesis conditions and the results obtained are reported in Table 1.

EXAMPLE 6

To a porcelain jar of 350 $cm^3$ capacity, equipped with two porcelain balls of 40 mm diameter, and two porcelain balls of 26 mm diameter, were charged 8.1 g of magnesium butyl-octyl-chloroethoxide having the following composition, by weight: Mg—21.5%; Cl—55.2%; $OC_2H_5$—11.9%; butyloctyl=11.4%, and 1.9 g of $TiCl_4$, wherein the magnesium butyl-octyl-chloroethoxide is a mixture of magnesium chloroethoxide (81 mole %) with butyloctyl magnesium (19 mole %).

A co-milling was carried out inside a RETSCH-type single-place mill for 8 hours. The catalytic solid was recovered within a dry-box.

Analysis showed the solid to have the following molar ratios: Mg/Ti=6.0:1; $OC_2H_5$/Ti=1.95:1.

The catalyst was tested in the polymerization of ethylene with propylene and 1,3-butadiene; the synthesis conditions and the results obtained are reported in Table 1.

COMPARATIVE EXAMPLE 1

Preparation of the Catalytic Component

The preparation of the catalytic component was carried out as disclosed in the preparation of the catalytic component of Example 1, the only difference being that it was carried out at 120° instead of 80° C.

Analysis showed the catalytic solid, dried under vacuum at 40° for one hour, to have the following molar ratios: Mg/Ti=8.9:1; $OC_2H_5$/Ti=0.6:1.

The catalyst was tested in the polymerization of ethylene with propylene and 1,3-butadiene; the synthesis conditions and the results obtained are reported in Table 1.

Preparation of Terpolymers:
Ethylene/Propylene/1,3-Butadiene

The synthesis of terpolymers was carried out in an autoclave of 1.5 liters capacity, equipped with a jacket, temperature control means and a magnetic stirrer. After being carefully cleaned, the autoclave was purged by an approximately 1 hour wash with propylene containing 1% triethylaluminum (TEAL). A further wash was carried out with propylene alone. Using suitable calibrated metering vessels, 1000 ml of propylene and 50 ml of butadiene were measured and charged to the autoclave. The temperature was increased to 40° with stirring, and ethylene under a pressure of 2 atmospheres was fed to the autoclave until saturated.

The catalytic system was separately prepared by contacting under a nitrogen atmosphere (at room temperature) the solid catalytic component with an amount of 5 mM/liter of triisobutylaluminum (TIBAL), for 5 minutes.

The suspension obtained was injected into the autoclave through an ethylene-pressurized cylinder. During the polymerization, both temperature and pressure were kept constant, the temperature automatically, and the pressure by feeding ethylene.

The polymerization was complete within a time of 1 to 2 hours, according to the catalytic activity. At the end of the test, 10 ml of acetone, containing IRGANOX-1010 at a weight ratio of 0.3/100 to the produced polymer, was charged. Five minutes later, the monomers were vented off and the autoclave was opened. The polymer was recovered and dried under a nitrogen stream at 70° C.

ANALYSES OF THE POLYMERS

The polymers were dried in an oven at 70° C. and the following analytical checks were carried out:

Determination of I.R. composition: $C_3$ % by weight and $C_4$ % by weight

Determination of $[\eta]^{THN}$ at 135° C.

$ML^{1+4}$ at 121° C. (crude polymer)

Wherein I.R. means infra red, $ML^{1+4}$ stands for Mooney viscosity, and THN stands for tetrahydronaphthalene.

Vulcanization

The vulcanization of the unsaturated terpolymer was carried out (after homogenizing the compound on a roller hot-press at 80° C. for 10 minutes) on a platen press at 160° C. for 30 minutes, with the following formulation:

| | |
|---|---|
| Terpolymer | 100 parts by weight |
| ZnO | 5 parts by weight |
| Stearic acid | 1 part by weight |
| FEF carbon black | 55 parts by weight |
| Cortis 100M oil | 30 parts by weight |
| Tertramethylthiuram monosulphide (TMTMS) | 1.5 parts by weight |
| Mercaptobenzothiazole (MBT) | 0.75 parts by weight |
| Sulphur | 1.5 parts by weight |

The determination of the values of tension set was carried out on polymer specimens having a useful length of 50 mm, a thickness and a width of 2 mm, the specimens being cut in the perpendicular direction relative to the direction of feed of the compound on the roller mixer.

For the determination, the standard specimen was stretched to 200% of its original length inside the metal bow of the device, and left standing 10 minutes at 23° C. The specimen was then removed from the bow, left standing 10 minutes at 23° C., and the measurement was carried out at once by means of a template.

RESULT COMPUTATION $$\text{Tension set } \% = \frac{L - L_o}{L_o} \times 100$$

wherein:
L = Specimen length after deformation (mm);
$L_o$ = Initial length of the specimen (50 mm).

EXAMPLE 7

Synthesis of a Copolymer: Ethylene/Propylene

Using the catalytic component of Example 1, a polymerization of ethylene with propylene was carried out, the synthesis conditions for which and the results obtained being reported hereunder:

| | |
|---|---|
| Propylene (g) | 475 |
| Ethylene (atm) | 2.5 |
| Temperature (°C.) | 40 |
| Polymerization time (hours) | 1 |
| Total pressure (atm) | 18.2 |
| Co-catalyst (TIBAL) mM/liter | 0.222 |
| Catalytic component (g) | 0.00267 |
| Yield (g/g of Ti) | 318,000 |
| $[\eta]^{THN}$ at 135° C. (dl/g) | 3.76 |
| $ML^{1+4}$ at 121° C. (crude polymer) | 64.7 |
| $C_3$ (% by weight) | 36 |
| On the vulcanized product: | |
| Tensile strength (kg/cm$^2$) | 182 |
| Elongation at break (%) | 485 |
| Tension set 200% (at 23° C.) | 7 |

The vulcanization of the copolymer was carried out at 165° C. on a platen press for 40 minutes, using the following formulation, which was previously homogenized on a roller hotpress at 80° C. for 10 minutes:

| | |
|---|---|
| Copolymer | 100 parts by weight |
| FEF carbon black | 80 parts by weight |
| Cortis 100M oil | 30 parts by weight |
| ZnO | 5 parts by weight |
| Sulphur | 0.4 parts by weight |
| Peroximon | 5 parts by weight |

EXAMPLE 8

Synthesis of a Terpolymer: Ethylene/Propylene/5-Ethyldiene-norbornene

Using the catalytic omponent of Example 1, a polymerization of ethylene with propylene and 5-ethyldiene-2-norbornene (ENB) is carried out, the synthesis conditions for which and the results obtained being reported hereunder:

| | |
|---|---|
| Propylene (g) | 475 |
| 5-Ethyldiene-2-norbornene (g) | 13.2 |
| Ethylene (atm) | 3.5 |
| Temperature (°C.) | 40 |
| Polymerization time (hours) | 2 |
| Total pressure (atm) | 19 |
| Co-catalyst (TIBAL) mM/liter | 1 |
| Catalytic component (g) | 0.0154 |
| Yield (g/g of Ti) | 144,000 |
| $[\eta]^{THN}$ at 135° C. (dl/g) | 2.41 |
| $C_3$ (% by weight) in the terpolymer | 41.1 |
| $ML^{1+4}$ at 121° C. (crude polymer) | 26 |
| ENB (% by weight) in the terpolymer | 3.2 |
| On the vulcanized product: | |
| Tensile strength (kg/cm$^2$) | 117 |
| Elongation at break (%) | 390 |
| Tension set 200% (at 23° C.) | 8 |

TABLE 1

| EXAMPLE No. | 1 | 2 | 3 | 4 | 5 | 6 | Comparative Example 1 |
|---|---|---|---|---|---|---|---|
| Catalytic component (g) | 0.0245 | 0.0223 | 0.0215 | 0.0485 | 0.200 | 0.0300 | 0.0130 |
| Polymerization time (h) | 1 | 1 | 1 | 1 | 1 | 1 | 1 |
| Yield (g/g of Ti) | 127,000 | 143,000 | 37,000 | 19,000 | 118,000 | 40,000 | 305,000 |
| $[\eta]^{TMN}$ at 135° C. (dl/g) | 2.83 | 1.96 | 2.4 | 2.5 | 2.78 | 4.34 | 2.27 |
| ($C_3^=$ (% by weight) | 47.9 | 44.3 | 35.1 | 32.2 | 38.9 | 41.4 | 36.6 |
| ($C_4^=$ (1–4 TRANS % by weight) | 2.83 | 2.1 | 1.5 | 2.1 | 1.5 | 0.8 | 1.7 |
| ($ML^{1+4}$ at 121° C. | 39 | 30 | 26.5 | 37.5 | 46 | — | 57.5 |
| (Tensile strength (kg/cm$^2$) (1) | 93 | 69 | 99 | 123 | 125 | 92 | 103 |
| (Elongation at break (%) (1) | 625 | 540 | 670 | 740 | 815 | 890 | 720 |
| Tension set 200% (at 23° C.) | 16 | 20 | 21 | 20 | 16 | 21 | 30 |

Synthesis conditions: TIBAL = 5 mM/litre; Temperature = 40° C.; Total pressure = 17 atm; Propylene = 475 g; 1,3-Butadiene = 32 g.
(1) Relatively to vulcanised polymer

We claim:
1. A process for producing elastomers by copolymerizing or terpolymerizing olefinic monomers selected from the group consisting of ethylene, alpha-olefins, and dienes, said process being catalyzed by a catalyst comprising:
   (A) an alkyl-metal compound, the metal being selected from Groups I, II and III of the Periodic Table: and
   (B) a catalytic compound comprising a reaction product from the reaction of:
      (a) a magnesium compound having the general formula:

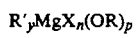

$R'_y MgX_n(OR)_p$ wherein:

X = Cl, Br;

R and R' may be the same or different from each other and are each selected from the group consisting of aliphatic, cycloaliphatic and aromatic hydrocarbon radicals containing from 1 to 20 carbon atoms;

n is a number from 0 to 1.8, inclusive;

p is a number from 0.2 to 2.0, inclusive;

y is a number from 0 to 1, inclusive; and n+y+p=2;

or a magnesium compound having the formula:

$MgCl_2 \cdot mROH$ wherein

R is as defined above, and m is a number from 0.2 to 6: and (b) a titanium compound having the general formula:

$Ti(OR)_z X_{4-z}$ wherein:

X and R are as defined above; and

Z is a number from 0 to 1, inclusive; said reaction product having a Mg/Ti molar ratio from 0.5 to 50, inclusive, and an OR/Ti molar ratio of from 0.7 to 10, inclusive;

wherein the molar ratio of the alkyl-metal compound to the titanium compound of the catalytic component is from 1 to 100.

2. The process of claim 1, wherein ethylene and propylene are copolymerized.

3. The process of claim 1, wherein ethylene is copolymerized with propylene and a diene selected from the group consisting of 1,3-butadiene and 5-ethyldiene-2-norbornene.

4. The process of claim 1, further comprising vulcanizing the copolymer or terpolymer obtained thereby.

* * * * *